United States Patent [19]

Axelrod et al.

[11] 4,401,792

[45] Aug. 30, 1983

[54] PROCESS FOR INCREASING THE RATE OF CRYSTALLIZATION OF POLYESTERS

[75] Inventors: Robert J. Axelrod, Glenmont, N.Y.; Frank N. Liberti, Mt. Vernon, Ind.; John Semen, Baton Rouge, La.

[73] Assignee: General Electric Company, Pittsfield, Mass.

[21] Appl. No.: 358,834

[22] Filed: Mar. 16, 1982

[51] Int. Cl.³ .................... C08F 8/00; C08L 67/02
[52] U.S. Cl. ........................... 525/175; 524/396; 524/412; 524/513; 525/176
[58] Field of Search ............. 524/396, 412, 513; 525/175, 176

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,516,957 | 6/1970 | Gray et al. | 524/315 |
| 3,591,659 | 6/1971 | Brinkmann et al. | 260/873 |
| 3,706,699 | 12/1972 | Conix et al. | 525/175 |
| 3,761,450 | 9/1973 | Herwig et al. | 525/437 |
| 3,833,685 | 9/1974 | Wambach | 524/409 |
| 3,855,277 | 12/1974 | Fox | 524/409 |
| 3,953,394 | 4/1976 | Fox et al. | 260/40 R |
| 4,022,748 | 5/1977 | Schlichting et al. | 260/40 R |
| 4,034,013 | 7/1977 | Lane | 260/835 |
| 4,034,016 | 7/1977 | Baron et al. | 260/858 |
| 4,044,073 | 8/1977 | Baron et al. | 260/860 |
| 4,090,996 | 5/1978 | Gergen et al. | 260/40 R |
| 4,096,202 | 6/1978 | Farnham et al. | 260/873 |
| 4,257,937 | 3/1981 | Cohen et al. | 260/40 R |

FOREIGN PATENT DOCUMENTS 1282679 7/1972 United Kingdom .
2015013A 9/1979 United Kingdom .

OTHER PUBLICATIONS

Science, May 23, 1980, vol. 208, p. 810.

*Primary Examiner*—Lucille M. Phynes
*Attorney, Agent, or Firm*—Hedman, Casella, Gibson, Costigan & Hoare

[57] ABSTRACT

A process is provided for increasing the rate of crystallization of polyester compounds, such as poly (alkylene arylates), more particularly poly(alkylene terephthalates), or blends or mixtures thereof, as for example, poly(ethylene terephthalate), poly(butylene terephthalate) or mixtures of blends thereof, by incorporating therein a small amount of a polyethylene ionomer, or an alkali metal salt of benzoic acid, such as sodium benzoate. The faster crystallization rates improve injection molding performance of the polyesters and blends thereof, such as reduced post-mold shrinkage, faster mold cycle times and lower mold temperature. Also, the resultant products show increases in physical properties such as flex modulus, flex strength, deflection temperature under load (DTUL), tensile strength and solvent resistance. The process is applicable not only to unfilled polyester compounds but also to mineral or glass-filled, or fire-retardant-containing compounds, to impact modified polyesters, as well as blends of polyesters, such as poly(ethylene terephthalate)/poly(butylene terephthalate) (PET/PBT) blends, unfilled and filled with the aforesaid components.

12 Claims, No Drawings

PROCESS FOR INCREASING THE RATE OF CRYSTALLIZATION OF POLYESTERS

INTRODUCTION TO THE INVENTION

This invention relates to a process of increasing the rate of crystallization of polyester compounds, such as poly(alkylene arylates) more particularly poly(alkylene terephthalate) and blends or mixtures thereof, as for example, poly(ethylene terephthalate) (PET), poly (butylene terephthalate) (PBT) or mixtures of blends thereof, by incorporating therein a small amount of a polyethylene ionomer, or an alkali metal salt of benzoic acid, preferably sodium benzoate, in an amount sufficient to promote the rate of crystallization of the polyesters.

The process results in products exhibiting improved molding performance, such as reduced post-mold shrinkage, faster molding cycle times, and lower mold temperatures as compared to the untreated polyester compounds and blends; the resulting products when molded show increases in physical properties such as flex modulus, flex strength, deflection temperature under load (DTUL), tensile strength and better solvent resistance.

The process is applicable not only to unfilled polyester compounds but also to mineral or glass-filled polyester compounds, and blends thereof and to impact modified polyesters particularly of poly(ethylene terephthalate) and poly (butylene terephthalate).

BACKGROUND OF THE INVENTION

Polyesters, such as poly(alkylene arylates), for example, those prepared from diprimary alcohols, namely, from glycols and terephthalic or isophthalic acid, have been available for a number of years. They are described inter alia in Whinfield et al, U.S. Pat. No. 2,465,319 and Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly (butylene terephthalate), as for example, poly (1,4-butylene terephthalate) because of its very rapid crystallization from the melt is uniquely useful as a component in such compositions. Work-pieces molded from such polyester resins, alone or combined with reinforcements, in comparison with other thermoplastics offer a high degree of surface hardness and abrasion resistance, high gloss and lower surface friction.

Stable polyblends of PET and PBT can be molded into useful unreinforced and reinforced articles. See Fox and Wambach U.S. Pat. No. 3,953,394 incorporated herein by reference.

However, the crystallization rates of the polyesters leave room for improvement, since it is well known in this field that faster crystallization rates improve injection molding performance, as evidenced by reduced post-mold shrinkage, faster mold cycle times, and lower mold temperatures.

It has now been discovered that not only the crystallization rate but that the percent crystallinity of poly(ethylene arylates) can be increased by incorporating therein a small amount of a polyethylene ionomer or an alkali metal salt of benzoic acid, as for example sodium benzoate, potassium benzoate, or lithium benzoate. This increase in the rate as well as percent of crystallinity is particularly significant in the case of PET and other polyesters containing PET. The process is applicable not only to unfilled polyester compounds but also to mineral or glass-filled, or fire-retardant containing polyester compounds and compositions; and to impact modified polyesters, as well as to blends of polyesters, such as poly(ethylene terephthalate)/poly(butylene terephthalate) (PET/PBT) blends unfilled or filled with the aforesaid components.

DESCRIPTION OF THE INVENTION

According to the subject invention, a process is provided for increasing the crystallization rate of (a) a polyester compound or blend of a polyester by incorporating therein (b) a polyethylene ionomer or an alkali metal salt of benzoic acid in an amount sufficient to increase or promote the rate of crystallization of (a).

Component (b) is generally incorporated in component (a) by melt coextrusion of a blend of the two components.

It has been found that even relatively minor or small amounts of (b) are effective in providing significant increases in the crystallization of (a). In general (b) will be employed in the process in amounts ranging from about 0.05% by weight to about 5.0% by weight based on the total weight of (a) and (b). More particularly in the case of polyethylene ionomer, the amount employed can range from about 0.1% by weight to about 5.0% by weight, and in the case of the alkali metal salt of benzoic acid from about 0.05% by weight to about 2.0% by weight.

The polyester resins (a) are available commercially or can be prepared by known techniques such as by the alcoholysis of esters of aryl dicarboxylic acids for example, terephthalic or isophthalic acid with diprimary alcohols, as for example, glycols, more particularly ethylene glycol, polymethylene glycols, di, tri, tetra or pentamethylene glycols, and subsequent polymerization, by heating the glycols with the free acids or with the halide derivatives thereof, and similar processes. These are described in U.S. Pat. No. 2,465,319 and U.S. Pat. No. 3,047,539 and elsewhere.

A preferred group of polyesters are poly(ethylene terephthalate), poly (propylene terephthalate), and poly (butylene terephthalate). A much preferred polyester is poly (ethylene terephthalate), and poly (ethylene terephthalate) containing products such as blends of poly (ethylene terephthalate) with the other above mentioned polyesters.

Commercially available poly(ethylene terephthalate) is available from Goodyear Chemical Co. under the brand name VITUF, and commercially available poly(butylene terephthalate) and blends of poly(ethylene terephthalate) with poly (butylene terephthalate) from General Electric under the trade name VALOX. Examples of the VALOX polyesters and blends which can be employed in the process of the present invention are: VALOX 815, 830, 850, 855, 860 and 865.

Illustratively the polyesters will have an intrinsic viscosity of at least about 0.4 deciliters/gram and preferably at least 0.6 deciliters/gram as measured in a 60:40 phenol/tetrachloroethane mixture at 30° C.

The ionomers employed in the present invention are in general, compolymers of unsaturated hydrocarbons and salts of unsaturated acids. The preferred ionomer is a polyethylene ionomer, as for example, that composed of approximately 10% acrylic acid, 5% of sodium acrylate and 85% of ethylene monomeric units. This ionomer is commercially available from the du Pont Company under the trade name Surlyn 1605.

Other examples of ionomer which may be employed are maleic anhydride styrene copolymer which is commercially available as Dylark 232, from Arco-Polymers, Inc. and ELVAX 4355 which is commercially available from Union Carbide. They are employed as the alkali metal salt, for example, sodium neutralized polymers.

Another example is the fluorocarbon ionomers described on p. 810 of Science (May 23, 1980) which are copolymers of tetrafluoroethylene with monomers containing perfluorinated sulfonyl functional groups which are in the sulfonic acid form and then converted to an acid salt or ionomer as shown in the following reaction scheme:

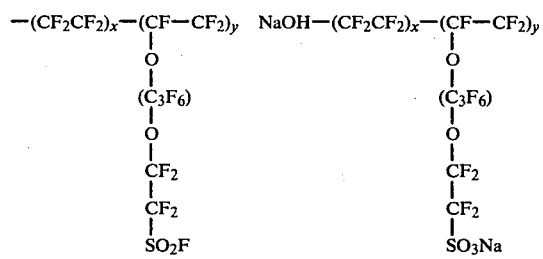

Perfluorinated ionomers where the SO$_3$Na is replaced by a COONa group, can also be employed in the instant invention.

In addition to the alkali metal salts of benzoic acid, there can be employed the alkaline earth metal salts; and corresponding salts of aryl carboxylic and sulfonic acids, for example alkali metal and alkaline earth metal salts of benzene sulfonic acid, naphthoic acid, and napthalene sulfonic acid.

Impact modified polyesters which can be employed in the present invention are obtained by adding various modifiers to the polyesters. For example, Brinkmann et al in U.S. Pat. No. 3,591,659 disclose that a useful family of modifiers comprises polyalkyl acrylates methacrylates and/or ethacrylates. Baron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer having a glass temperature below −20° C. is a useful modifier. Lane, U.S. Pat. No. 4,034,013, and Farnham et al U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corresponding German No. 2650870) disclose an impact modifier combination comprising a blend of a poly-urethane and an aromatic polycarbonate. Copending application Ser. No. 957,801, filed Nov. 6, 1978, discloses an impact modifier combination comprising a poly(alkyl acrylate) and an aromatic polycarbonate. Gergen et al U.S. Pat. No. 4,090,996 disclose an impact modifier combination comprising a vinyl aromatic-diene copolymer in combination with a "dissimilar engineering thermoplastic." All of the foregoing patents and application are incorporated herein by reference. Filled reinforced and/or flame retardant modifications of such polyesters are also well known in the art.

In certain preferred features the polyester composition will include fillers, especially reinforcing fillers such as fibrous (filamentous) glass or mineral fillers, such as clay, mica, talc and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.250 inch. The glass is predispersed in the polyester compositions.

The amount of the filler can vary widely depending on the formulation and needs of the particular composition, it being essential only that an amount is selected which is at least sufficient to provide reinforcement. Preferably, however, the reinforcing filler will comprise from about 1 to about 60% by weight of total composition.

The polyesters or impact modified polyesters (a) alone, or in combination with a filler (c) and containing (b) can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units. See, for example, Wambach, U.S. Pat. No. 3,833,685, and Fox, U.S. Pat. No. 3,855,277, which are incorporated herein by reference.

Other ingredients, such as dyes, pigments, drip inhibitors, and the like can be added for their conventionally employed purposes.

The process of this invention can be carried out in a number of ways. In one way, ionomer or salt (b) any any reinforcement, e.g., glass fibers, and/or non-reinforcing filler or fire retardants are put into an extrusion compounder with polyester or polyester containing product (a) to product molding pellets. The modifier and filler and/or reinforcement, if any, are dispersed in a matrix of (a) in the process. In another procedure, (b) is mixed with the (a) by dry blending, then either fluxed on a mill and comminuted, or they are extruded and chopped.

It is always important to thoroughly free all of the ingredients; resin, modifier, reinforcement, filler, if used, and any optional, conventional additives from as much water as possible.

In addition, compounding should be carried out to ensure that the residence time in the machine is short; the temperature is carefully controlled; friction heat is utilized; and an intimate blend between (a) and (b) is obtained. The temperature at which (b) is incorporated into (a) may range from about 450° to about 550° F.

Although it is not essential, best results are obtained if the ingredients are pre-compounded, pelletized and then molded. Pre-compounding can be carried out in conventional equipment. For example, after carefully pre-drying the polyester and crystallization promoter (b) and the reinforcing agent, or filler, if used, e.g., for 2 hours at 250° F., a single screw extruder is fed with a dry blend of the ingredients, the screw employed having a long transition section to ensure proper melting. On the other hand, a twin screw extrusion machine, e.g., a Werner Pfleiderer machine can be fed with (a) and (b) at the feed port and reinforcement down stream. In either case, a generally suitable machine temperature will be about 450° to 550° F.

The pre-compounded composition can be extruded and cut up into molding compounds such as conventional granules, pellets, etc. by standard techniques.

The products obtained by the process of the instant invention can be molded in any equipment conventionally used for glass-filled thermoplastic compositions, e.g., a Van Dorn type injection molding machine with conventional cylinder temperatures, e.g., about 450° to about 550° F., and conventional mold temperatures, e.g. about to about 150° F.

DESCRIPTION OF THE PREFERRED EMBODIMENTS

The following examples illustrate the invention. They are set forth as further description but are not to be construed as limiting the invention. In Examples 1 and 2 the DSC Exotherm Temperatures and DSC Exotherm Area are measured by differential scanning calorimetric (DSC) scanning of the polyester and polyester blends alone and in combination with the crystallization promoting agent, under the following conditions:

(1) 130°-280°-130° C. heat/cool cycle, (2) 20° C./min. heat/cool rates, (3) X 5 range. The DSC measurements indicate the rate of crystallization (position of exotherm) and in percent crystallinity (area of exotherm).

EXAMPLES

A blend of poly(ethylene terephthalate) resin PET, and an ionomer composed of approximately 10% acrylic acid, 5% sodium acrylate, and 85% ethylene monomeric units (Surlyn 1605) is compounded and melt co-extruded in an extruder at about 500° F. The DSC crystallization rate and percent crystallinity are measured as described above. For comparison purposes the PET is melt extruded in the same way, omitting the ionomer and its DSC crystallization and percent crystallinity are measured in the same manner.

The procedure is the same in the various other examples where PBT replaces the PET or blends of PET and PBT are employed, and the ionomer is replaced by sodium benzoate as the crystallization promoter, and where the polyesters and blends are filled or unfilled, with glass, minerals or flame retardants.

The formations and physical properties are set forth in the tables which follow:

TABLE 1

|  | Example 1 | Example 2 |
|---|---|---|
| PET, % | 99 | 100 |
| Surlyn 1605 Ionomer, % | 1 | 0 |
| DSC Exotherm Temperatures (°C.) | | |
| Onset | 218 | 218 |
| Maximum Rate | 204.5 | 182 |
| Completion | 173 | 156 |
| DSC Exotherm Area | | |
| mg. area/mg PET | 8.35 | 7.51 |
| Tests | | |
| Flex. Modulus, psi | 388,000 | —* |
| Flex strength, psi | 15,600 | —* |
| Tensile strength, psi | 9,200 | —* |

*not able to produce satisfactory test parts by injection molding.

TABLE 2

| | EXAMPLES | | | |
|---|---|---|---|---|
| | 3 | 4 | 5 | 6 |
| PET, % | 99.5 | 99 | 98 | 97 |
| Surlyn 1605, % | 0.5 | 1 | 2 | 3 |
| TESTS | | | | |
| Notched Izod, ft. lbs./in. | 0.5 | 0.5 | 0.5 | 0.5 |
| Unnotched Izod, ft. lbs/in. | 7.6 | 8.8 | — | 9.7 |
| Flex Strength, psi | 15,800 | 15,900 | 15,500 | 15,400 |
| Flex Modulus, psi | 419,000 | 416,000 | 401,000 | 397,000 |
| Tensile Strength, psi | 8,900 | 9,330 | 9,040 | 9,180 |
| Tensile Elongation, % | 224 | 137 | 87 | 68 |
| Gardner Impact, in.-lbs. | 16 | 16 | 16 | 16 |
| Melt Viscosity Pell, 510° F., poise | 1230 | 1230 | 1230 | 1340 |

TABLE 3

| | EXAMPLES | | | | | | |
|---|---|---|---|---|---|---|---|
| | 7 | 8 | 9 | 10 | 11 | 12 | 13 |
| PBT, % | 44.6 | 44.1 | 41.4 | 34.5 | 22.9 | 17.2 | — |
| PET, % | 25.4 | 24.9 | 27.6 | 34.5 | 46.1 | 51.8 | 65.2 |
| Glass | 30 | 30 | 30 | 30 | 30 | 30 | 30 |
| SURLYN 1605, % | — | 1 | 1 | 1 | 1 | 1 | 1 |
| Neopentyl glycol bis-benzoate | — | — | — | — | — | — | 3.8 |
| TESTS | | | | | | | |
| Heat Distortion at 264 psi, °F. | 395 | 394 | 388 | 388 | 352 | 364 | 392 |
| Notched Izod, ft. lbs./in. | 1.63 | 1.62 | 1.64 | 1.73 | 1.8 | 1.58 | 1.25 |
| Unnotched Izod, ft. lbs./in. | 13.0 | 12.8 | 12.6 | 12.6 | 12.0 | 12.6 | 8.5 |
| Flex Strength, psi | 27,100 | 26,700 | 26,800 | 26,200 | 26,300 | 16,100 | 28,100 |

TABLE 3-continued

| | EXAMPLES | | | | | | |
|---|---|---|---|---|---|---|---|
| | 7 | 8 | 9 | 10 | 11 | 12 | 13 |
| Flex Modulus, psi | 992,000 | 1,021,000 | 1,011,000 | 1,042,000 | 1,042,000 | 1,011,000 | 1,228,000 |
| Tensile Strength psi | 16,300 | 16,700 | 16,400 | 15,300 | 15,700 | 15,700 | 18,500 |
| Tensile Elongation % | 11 | 11 | 11.2 | 9.9 | 10.2 | 10.4 | 10.7 |
| Specific Gravity | 1.545 | 1.543 | 1.541 | 1.547 | 1.555 | 1.553 | 1.581 |
| Melt Viscosity Pell, 510° F. poise | 7,210 | 6,570 | 7,320 | 6,890 | 6,460 | 6,460 | 3,230 |

TABLE 4

| | EXAMPLES | | | | | |
|---|---|---|---|---|---|---|
| | 14 | 15 | 16 | 17 | 18 | 19 |
| PET, % | 70 | 69 | 69 | 69 | 69 | 69 |
| Class, % | 30 | 30 | 30 | 30 | 30 | 30 |
| 1% of | — | Elvax 4355 | Elvax 4335 50% Na | Dylark 232 | Dylark 232 | Dylark 232 |
| TESTS | | | | | | |
| Heat Distortion at 264 psi, °F. | 196 | 182 | 198 | 190 | 212 | 208 |
| Notched Izod, ft. lbs./in. | 1.51 | 1.74 | 1.61 | 1.37 | 1.48 | 1.30 |
| Unnotched Izod, ft. lbs./in. | 10.6 | 12.4 | 12.5 | 10.7 | 8.2 | 9.2 |
| Flex Strength, psi | 28,100 | 26,900 | 27,100 | 26,400 | 27,200 | 26,800 |
| Flex Modulus, psi | 1,086,000 | 1,031,000 | 1,074,000 | 1,042,000 | 1,011,000 | 1,063,000 |
| Tensile strength, psi | 18,100 | 17,700 | 17,800 | 17,500 | 16,800 | 17,100 |
| Tensile Elongation, % | 12.6 | 12.9 | 12.6 | 11.4 | 11.1 | 11.5 |
| Specific Gravity | 1.597 | 1.566 | 1.558 | 1.566 | 1.569 | 1.571 |
| Melt Viscosity Pell 510° F., poise | 7300 | 6660 | 6180 | 5350 | 4760 | 5230 |

The following examples are illustrative of sodium benzoate being employed as the crystallization promoting agent.

TABLE 5

| | EXAMPLES | | | | | |
|---|---|---|---|---|---|---|
| | A | 20 | B | 21 | 22 | 23 |
| VALOX 420, % | 100 | 99.0 | 0 | 0 | 0 | 0 |
| VALOX 830, % | — | 0 | 100 | 99.1 | 99.75 | 99.0 |
| Na benzoate, % | — | 1.0 | 0 | 0.1 | 0.25 | 1.0 |
| TESTS | | | | | | |
| Heat Distortion 264 psi, °F. | 395 | 400 | 386 | 387 | 392 | — |
| Notched Izod, ft. lbs./in. | 1.82 | 1.33 | 1.64 | 1.62 | 1.52 | 1.42 |
| Unnotched Izod, ft. lbs./in. | 12.3 | 5.3 | 12.6 | 13.0 | 11.6 | 5.6 |
| Flex. Strength, psi × $10^{-3}$ | 26.9 | 25.8 | 26.8 | 27.1 | 28.6 | 21.1 |
| Flex. Modules, psi × $10^{-3}$ | 983 | 1109 | 1003 | 1023 | 1090 | 1093 |
| Tensile Strength, psi × $10^{-3}$ | 16.3 | 16.7 | 15.5 | 16.4 | 17.8 | 14.7 |
| Tensile Elongation, % | 4.3 | 2.9 | 4.1 | 4.1 | 3.7 | 2.3 |
| Specific Gravity | 1.530 | 1.539 | 1.549 | 1.547 | 1.554 | 1.561 |
| Melt Viscosity Pell, poise | 10,100* | 4,600* | 5,650** | 3,700** | 2,980** | 1,710** |
| D495 (arc resistance), sec. | 80 | 21 | 108 | 50 | 42 | 31 |

*482° F.
**510° F.

TABLE 6

| | EXAMPLES | | | | | |
|---|---|---|---|---|---|---|
| | A | 24 | B | 25 | C | 26 |
| VALOX 420, % | 100 | 99.85 | — | 0 | — | — |
| VALOX 815, % | 0 | — | 100 | 99.85 | — | — |
| VALOX 830, % | 0 | — | — | 0 | 100 | 99.8 |
| Na benzoate, % | 0 | 0.15 | — | 0.15 | — | 0.2 |
| TESTS | | | | | | |
| Heat Distortion at 264 psi, °F. | 394 | 399 | 354 | 374 | 388 | 387 |
| Notched Izod, ft. lbs./in. | 1.78 | 1.57 | 0.91 | 0.89 | 1.70 | 1.40 |

TABLE 6-continued

|  | EXAMPLES | | | | | |
| --- | --- | --- | --- | --- | --- | --- |
|  | A | 24 | B | 25 | C | 26 |
| Unnotched Izod, ft. lbs./in. | 14.12 | 12.49 | 5.68 | 5.48 | 13.5 | 10.87 |
| Flex Strength, psi × 10⁻³ | 28.5 | 29.6 | 22.9 | 23.6 | 28.2 | 28.3 |
| Flex. Modulus, psi × 10⁻³ | 1031 | 1104 | 703 | 728 | 1063 | 1148 |
| Tensile Strength, psi × 10⁻³ | 17.6 | 18.6 | 14.1 | 14.7 | 16.7 | 18.3 |
| Specific Gravity | 1.531 | 1.536 | 1.427 | 1.429 | 1.555 | 1.551 |
| Melt Viscosity Pell, poise | 11,600* | 8,400* | 4,690** | 2,800** | 6,200** | 3,200** |

*482° F., poise
**510° F., poise

TABLE 7

|  | EXAMPLES | | | | | |
| --- | --- | --- | --- | --- | --- | --- |
|  | A | 27 | 28 | 29 | 30 | B |
| PBT, % | 45 | 44.85 | 24.85 | 4.85 | 4.5 | 5.0 |
| PET, % | 25 | 25 | 45 | 65 | 65 | 65 |
| Glass, % | 30 | 30 | 30 | 30 | 30 | 30 |
| Na Benzoate, % | — | 0.15 | 0.15 | .15 | 0.5 | — |
| TESTS |  |  |  |  |  |  |
| Heat Distortion at 264 psi, °F. | 386 | 376 | 364 | 400 | 410 | 299 |
| Notched Izod, ft. lbs./in. | 1.21 | 1.14 | 1.12 | 0.92 | 0.90 | 1.11 |
| Unnotched Izod, ft. lbs./in. | 9.81 | 8.48 | 7.69 | 5.01 | 3.17 | 8.20 |
| Flex Strength, psi × 10⁻³ | 25.9 | 25.6 | 24.7 | 23.7 | 20.6 | 26.7 |
| Flex Modulus, psi × 10⁻³ | 1,031 | 1,076 | 1,083 | 1,153 | 1,146 | 1,116 |
| Tensile Strength, psi × 10⁻³ | 15.4 | 16.0 | 16.0 | 15.5 | 13.1 | 16.3 |
| Specific Gravity | 1.544 | 1.541 | 1.552 | 1.575 | 1.580 | 1.567 |
| Melt Viscosity Pell 510° F., poise | 6,030 | 3,250 | 3,070 | 2,620 | 2,090 | 4,260 |

The optimum amount of sodium benzoate in VALOX 420 is lower than 1%, as shown by the decrease in melt viscosity (MV) and unnotched Izod. However, even at this low MV, the flexural modulus, tensile strength and DTUL have increased. In VALOX 830 the effect of sodium benzoate is dramatic, especially at 0.25% (sample E) below. With virtually no sacrifice in Izod strengths the DTUL, flexural strength, flexural modulus and tensile strength have been considerably improved, with the latter three being now better than the VALOX 420 control. This was accomplished at a 510° F. MV of less than 3000 poise. Moreover the pellet appearance and molded part appearance of sample E were much improved over the VALOX 830 control i.e., much more homogeneous while retaining all of the resin rich surface gloss that characterizes VALOX 830.

The following table presents the degree of crystallinity of the samples. This value is computed from the area under the crystallization peak from a DSC curve of a pellet of each sample after the sequence heat/cool/heat/cool, all at 20° C./minute.

| Sample | % Crystallinity |
| --- | --- |
| VALOX |  |
| A(420) | 32.0 |
| B(420 + 1% NaBz*) | 33.1 |
| C(830) | 27.5 |
| D(830 + 0.1% NaBz) | 25.6 |
| E(830 + 0.25% NaBz) | 27.3 |
| F(830 + 1.0% NaBz) | 26.2 |

*Sodium benzoate

The rate of crystallization is exemplified by the following tabulation. The samples were (1) VALOX 420 and (2) VALOX 420 plus 1% of Surlyn 1605 ionomer. The tests were made by a polarizing microscope time-determination scan $t_i$ and $t\frac{1}{2}$ are average values for four runs.

| Sample No. | Crystallization Temperature °F. | Initiation $t_i$ (sec) | Crystallization half-time $t\frac{1}{2}$ (sec) |
| --- | --- | --- | --- |
| 1 | 198 | 1.49 | 0.37 |
| 2 | 198 | 1.44 | 0.32 |
| 1 | 251 | 1.70 | 0.34 |
| 2 | 251 | 1.59 | 0.33 |
| 1 | 272 | 1.87 | 0.39 |
| 2 | 272 | 1.69 | 0.33 |

The above identified patents and/or publications are incorporated herein by reference. Obviously, other modifications and variations of the present invention are possible in the light of the above teachings. For example, reinforced and/or filled compositions can be prepared, and these can be rendered flame retardant. It is therefore, to be understood that changes may be made in the particular embodiments described above which are within the scope of the invention as defined in the appended claims.

We claim:

1. A process for increasing the rate of crystallization of (a) a polyester compound selected from the group consisting of a poly(butylene terephthalate) and a blend of poly(butylene terephthalate) and poly(ethylene terephthalate) which comprises incorporating therein (b) an alkali metal salt of benzoic acid in an amount sufficient to promote the rate of crystallization of (a).

2. A process for increasing the rate of crystallization of a polyester compound selected from the group consisting of a poly(butylene terephthalate) and a blend of poly(butylene terephthalate) and poly(ethylene terephthalate) which comprises incorporating therein (b) an ionomer in an amount sufficient to promote the rate of crystallization of (a).

3. A process as described in either of claims 1 or 2, wherein the polyester is poly(butylene terephthalate).

4. A process as described in either of claims 1 or 2, wherein the polyester is a blend comprising poly(ethylene terephthalate) and poly(butylene terephthalate).

5. A process as described in either of claims 1 or 2, wherein the amount of (b) is from about 0.05% by weight to about 5.0% by weight based on the total weight of (a) and (b).

6. A process as described in claim 2, wherein (b) is an ionomer composed of acrylic acid, sodium acrylate and ethylene monomeric units.

7. A process as described in claim 1, wherein the alkali metal salt is sodium benzoate.

8. A process as described in either of claims 1 or 2, wherein (a) is filled with (c) a mineral filler.

9. A process as described in either of claims 1 or 2, wherein (a) is glass-filled.

10. A process as described in claim 9, wherein fibrous glass is predispersed in (a).

11. A process as described in either of claims 1 or 2, wherein (a) includes (d) a flame-retardant amount of a flame retardant agent or agents.

12. A process as described in claim 11, wherein (d) comprises an aromatic polycarbonate containing units of tetrabromobisphenol-A and antimony oxide.

* * * * *